UNITED STATES PATENT OFFICE.

HANS GOLDSCHMIDT, OF ESSEN-ON-THE-RUHR, GERMANY, ASSIGNOR TO THE FIRM OF TH. GOLDSCHMIDT, OF ESSEN-ON-THE-RUHR, GERMANY.

THERMIC PROCESS.

No. 875,345.  Specification of Letters Patent.  Patented Dec. 31, 1907.

Application filed January 6, 1906. Serial No. 294,972.

*To all whom it may concern:*

Be it known that I, HANS GOLDSCHMIDT, a subject of the King of Prussia, German Emperor, and resident of Essen-on-the-Ruhr, German Empire, have invented certain new and useful Improvements in and Relating to the Goldschmidt Thermic Process, of which the following is an exact specification.

In another patent application Ser. No. 294971 which I file together with this application, it has been stated that an excellent result is obtained by the employment of a mixture of calcium-silicon being used as a reducing agent in metallic oxids, metal or halogen compounds, sulfids or in metallic salts. Now it has by extensive experiments been established that a mixture of calcium and aluminum, in the place of the mixture of calcium and silicon, will also produce a high thermic effect, furthermore that the use of such a metallic mixture renders possible the production of a thinly liquid slag, to which by an addition of other substances the property of "sintering" (*i. e.* of coalescing or growing into a solid mass without passing through a state of complete fluidity) can be given, so that it becomes possible to use this mixture for all the known applications of the Goldschmidt thermic process. Naturally, instead of the mixture of calcium and aluminum a calcium-aluminum alloy can be used, presenting the advantage of being more resistant against the atmosphere. A surprising fact when operating with this mixture or alloy of calcium and aluminum is, that, while calcium alone, brought to reaction with *e. g.* iron oxid, produces a considerably lower caloric effect than *e. g.* aluminum, although the heat of combustion of calcium is higher than that of aluminum, a much higher caloric effect is produced when using a mixture of calcium and aluminum. This is clearly provided by the following: When mixing aluminum with iron oxid, and bringing this mixture to reaction, a quantity of iron equaling about one third of the total weight of the mixture may be added to the liquid iron, and still the iron as well as the slag obtained will be perfectly liquid. If calcium is taken and mixed with an equivalent quantity of iron oxid and metallic iron is added to the amount of one third of the weight of the mixture, a "sintering" mass is obtained, a result, which is partly due to the production of a slag which fuses with difficulty. If however a mixture is taken of aluminum and calcium intimately mixed with iron oxid or iron-oxid-protoxid (Fe [Fe$_2$] O$_4$) in the manner of the Goldschmidt thermic process, the thermic effect is considerably increased, and more than double the quantity of iron, *i. e.* ⅔ of the total weight of the mixture can be added without causing the slag to solidify or the iron to become sluggish. This is a thermic effect which, in comparing the mixture of calcium and aluminum to the pure aluminum thermit, shows the perfect suitability of the former. In the following a survey is given of the knowledge gained in the course of extensive experiments: It has been more and more clearly borne out by these experiments that, for technical reasons, pure calcium alone is not suitable for carrying out these reactions. It has been stated in my other application, that the reaction between calcium and chromic oxid is only slow and results in a "sintered" mass. Using other oxids *e. g.* vanadic oxid or the oxids of lead or copper a more violent reaction is produced. Calcium acts most energetically on saltpeter, and it is most remarkable that calcium mixed with ammonia nitrate is self-igniting and burns off like gunpowder. It is furthermore known that aluminum acts very strongly on gypsum and other sulfates such as Glauber's salt. Carried out with calcium this reaction is still more energetic.

One fact demonstrated by the experiments was the great velocity of the reactions carried out with calcium, surpassing in rapidity the aluminum thermit mixtures. It was further shown in the course of the experiments with mixtures of calcium and aluminum with metallic oxids, that the reaction is accelerated in its course, and that thereby the energy, created while the mixture burns off, is increased. It must further be mentioned that the calcium oxid with the aluminum oxid forms a more thinly liquid slag. It is also possible that, by the union of the oxids of calcium and aluminum an exo-thermic effect is produced, further increasing the caloric effect.

The greatest efficiency and the quietest reactions are generally obtained with mixtures composed in such way as to give the most possibly thinly liquid slag; a thinly liquid aluminate is calcium-aluminum-oxid (3CaO2Al$_2$O$_3$). This is actually obtained by mixing together about 60% of an equivalent mixture of aluminum with iron oxid or oxydulated iron respectively (so-called "thermit") and 40% of an equivalent mixture of finely divided calcium and iron oxid; this nearly exactly corresponds with an alloy of equal parts of calcium and aluminum (to be exact 49Al5lCa).

Regarding the caloric effect of the mixtures, the calorimeter furnishes valuable indications in this respect, generally preference will be given to the mixture yielding the highest thermic effect. Nevertheless it is, of course, possible, and in many instances it will be necessary, to carry out reactions with mixtures of a restricted caloric effect, be it for the purpose of welding, or for producing metals, or for heating other bodies, liquids and the like. Furthermore, not only has calcium thermit (the name that may be given to a mixture consisting of about equal parts of metallic calcium and iron oxid) been admixed to the known (aluminum-) thermit, and the result of such mixtures been carefully observed, but mixtures consisting of the three metals calcium, aluminum and silicon and of oxygen compounds, have also been examined. Of course the alloy of these three metals can equally well be employed as reducing agent. At the same time, as mentioned already, to these metals other metals possessing reducing properties may be added, particularly certain quantities of alkaline metals, in order thus to obtain qualities of slag resembling glass substance. The calcium may also be wholly or partially replaced by strontium or barium. As a reducing agent may, besides silicon, especially manganese be added (pure or in the form of ferro-manganese).

It is clear that in practice, when choosing between all these reducible metals, not only their caloric efficiency, but also their atomic weight and their equivalency will have to be considered.

When using the mixture of the easily oxidable calcium as such, with aluminum, the contact with the air will of course, have to be avoided as much as possible and this calcium-aluminum-thermit will preferably be kept in air-tight receptacles.

By using an addition of calcium for the reactions a better separation of the metal is frequently achieved in cases where with aluminum alone uniform reguli could not be obtained.

Hereinafter various of the so-called thermit-mixtures are enumerated and the results described.

An addition of silicon to the aluminum produces, as already known, the effect of considerably lowering the caloric effect of the thermit mixtures, so that e. g. with an addition of 17% of silicon to the aluminum, the amount of heat yielded by such a mixture, if compared to the mixture made with aluminum (the ordinary trade "thermit") is only about 75%. In consequence of the lively reactions which result when calcium alone is mixed with oxids or chlorids, it is not easy to make these determinations in the ordinary calorimeter; as a matter of fact these determinations, if carried out under equal conditions, give a much lower figure for thermit made with calcium alone than for the ordinary trade "thermit." Mixtures of calcium and iron oxid will still yield small quantities of metallic iron, but owing to the limited fluidity of the slag, the separation is insufficient for practical purposes, and a characteristic sign of the actually lower caloric, i. e., practical efficiency is to be seen in the fact that, as soon as even small quantities only of metallic iron are added to the calcium-thermit, the mass only still "sinters," whereas to the ordinary "thermit" and to the so-called calcium-aluminum-thermit large quantities of iron may be added without causing the mass to "sinter." On the other hand, the amount of heat produced is considerably larger in the case of calcium-silicium being used than with calcium alone (subject matter of my second application) especially when operating with mixtures or alloys containing as reducing agent two parts calcium and 1 part silicon. But these mixtures do not either come up to the ordinary thermit. The best result is achieved by aluminum to which an equal part of calcium is added. The mixture may consist of 40% of an about equivalent mixture of calcium and iron oxid on the one side, and of 60% of an equivalent mixture of aluminum and iron oxid on the other. The same proportion is to be observed when reducing chromium oxid to chromium, if a good result is to be obtained. Another mixture giving similarly good reuslts is: 70 kg calcium thermit and 30 kg aluminum thermit.

As regards calcium-aluminum-silicium-thermit a good result and a highly thinly liquid slag are yielded by a mixture of metals which after the reaction leaves a slag of the following composition: Calcium-aluminum-silicon-oxid $(3CaO.Al_2O_3Si.3O_2)$ and which accordingly would have to consist of 50 parts aluminum-thermit, 70 parts calcium thermit and 100 parts silicon thermit. Still the caloric effect is lower than that of the known aluminum-thermit (about 75%) but the mixture is still suitable for technical purposes especially for welding. The thermic effect is not greatly diminished by using aluminum, silicon and calcium in slightly different proportions. E. g., equal portions of aluminum-silicium- and calcium-thermit, or two portions of aluminum, 1 portion of silicon and 1 portion of calcium-thermit or 1 portion of aluminum-, 1 portion of silicon- and two portions of calcium-thermit. The last mentioned mixture is the least efficient one as far as heat production is concerned.

With reference to the reduction of other metals, it may be mentioned that e. g. chromic oxid is very effectively reduced by a mixture of calcium and aluminum, the best reduction is when yielding a slag according to formula calcium - aluminum - oxid ($3CaO2Al_2O_3$). A good reguline extraction of manganese is effected by calcium and silicon, whereas chlorid of manganese is more readily produced by calcium and silicon than by calcium and aluminum. Sulfid of copper again is very easily reduced into a regulus by calcium-aluminum than by calcium-silicon. Sulfid of lead mixed with calcium alone, explodes with a strong detonation on being ignited, whereas the reaction is very quiet when using calcium and silicon, and a good reguline separation takes place when using calcium and aluminum.

Having thus fully described the nature of my invention, what I desire to secure by Letters Patent of the United States is:—

1. A thermic mixture, consisting of metallic substances, containing calcium, aluminum and a metallic compound capable of being reduced to a metal, the substances being thoroughly mixed with each other and the proportions of the two active reducing metals being such that calcium forms one quarter to three quarters in weight of the weight of the two active metals.

2. A thermic mixture consisting of metallic substances, containing calcium and aluminum in form of an alloy and a metal compound capable of being reduced to a metal, the substances being thoroughly mixed with each other and the proportions of the two active reducing metals being such that calcium forms one quarter to three quarters in weight of the weight of the two active metals.

3. A thermic mixture consisting of metallic substances, containing calcium and aluminum and a metal compound containing only metal and oxygen, the substances being thoroughly mixed with each other and the proportions of the two active reducing metals being such that calcium forms one quarter to three quarters in weight of the weight of the two active metals.

4. A thermic mixture consisting of metallic substances containing calcium and aluminum in form of an alloy and a metal compound containing only metal and oxygen, the substances being thoroughly mixed with each other and the proportions of the two active reducing metals being such that calcium forms one quarter to three quarters in weight of the weight of the two active metals.

5. A thermic mixture consisting of metallic substances containing calcium and aluminum and an iron-oxid compound the substances being thoroughly mixed with each other.

6. A thermic mixture consisting of metallic substances containing calcium and aluminum and of iron-oxid ($Fe_2O_3$) and iron-oxid-protoxid ($Fe_3O_4$), the substances being thoroughly mixed with each other.

7. A thermic mixture consisting of metallic substances containing calcium and aluminum in form of an alloy and of an iron-oxid compound the substances being thoroughly mixed with each other.

8. A thermic mixture consisting of metallic substances containing calcium and aluminum in form of an alloy and of iron-oxid ($Fe_2O_3$) and of iron-oxid-protoxid ($Fe_3O_4$), the substances being thoroughly mixed with each other.

9. A thermic mixture consisting of metallic substances containing calcium and aluminum and of other active metals and of an iron-oxid compound the substances being thoroughly mixed with each other.

10. A thermic mixture consisting of metallic substances containing about 40 per cent. of a mixture of calcium with an iron-oxid compound and about 60 per cent. of a mixture of aluminum with an iron-oxid compound.

11. A thermic mixture consisting of metallic substances containing about 40 per cent. of a mixture of calcium with iron-oxid ($Fe_2O_3$) and iron-oxid protoxid ($Fe_3O_4$) and about 60 per cent. of a mixture of aluminum with iron-oxid ($Fe_2O_3$) and iron-oxid-protoxid ($Fe_3O_4$).

In witness whereof I have hereunto set my hand in the presence of two witnesses.

HANS GOLDSCHMIDT.

Witnesses:
 WOLDEMAR HAUPT,
 HENRY HASPER.